United States Patent
Pourian et al.

(10) Patent No.: US 12,106,493 B2
(45) Date of Patent: Oct. 1, 2024

(54) ACCURATE OPTICAL FLOW ESTIMATION IN STEREO PAIRS OF EQUIRECTANGULAR IMAGES

(71) Applicant: Intel Corporation, Santa Clara, CA (US)

(72) Inventors: Niloufar Pourian, Los Gatos, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 17/125,467

(22) Filed: Dec. 17, 2020

(65) Prior Publication Data

US 2021/0103764 A1    Apr. 8, 2021

(51) Int. Cl.
| | |
|---|---|
| *G06T 7/269* | (2017.01) |
| *G06T 7/00* | (2017.01) |
| *G06T 7/20* | (2017.01) |
| *G06V 10/82* | (2022.01) |

(52) U.S. Cl.
CPC .......... *G06T 7/269* (2017.01); *G06T 7/0002* (2013.01); *G06T 7/20* (2013.01); *G06V 10/82* (2022.01)

(58) Field of Classification Search
CPC ......... G06T 7/269; G06T 7/0002; G06T 7/20; G06T 7/207; G06T 2207/20084; G06T 2207/10016; G06T 3/04; G06V 10/82; G06N 3/045
See application file for complete search history.

(56) References Cited

U.S. PATENT DOCUMENTS

| | | | |
|---|---|---|---|
| 10,498,958 B2 * | 12/2019 | Meler | ............ G06T 7/55 |
| 2019/0045168 A1 | 2/2019 | Chaudhuri et al. | |
| 2019/0156145 A1 | 5/2019 | Pourian et al. | |
| 2020/0193609 A1 | 6/2020 | Dharur et al. | |
| 2021/0004969 A1 | 1/2021 | Pourian et al. | |
| 2022/0124298 A1 * | 4/2022 | Chen | ............ H04N 9/64 |

FOREIGN PATENT DOCUMENTS

WO    2020050828    3/2020

OTHER PUBLICATIONS

Office Action from Netherlands Patent Application No. 2029657 notified Apr. 4, 2023, 10 pgs.
Artizzu, C., et al., "OmniFlownet: A perspective neural network adaptation for optical flow estimation in omnidirectional images", 25th International Conference on Pattern Recognition, ICPR 2020, 2 pgs.
Coors, Benjamin, et al., "SphereNet: Learning Spherical Representations for Detection and Classification in Omnidirectional Images", ECCV 2018, LNCS 11213, pp. 525-541.

(Continued)

*Primary Examiner* — John B Strege
(74) *Attorney, Agent, or Firm* — Hanley, Flight & Zimmerman, LLC

(57) ABSTRACT

Techniques related to optical flow estimation for equirectangular images are discussed. Such techniques include combining an optical flow map generated using an input pair of equirectangular images and an optical flow map generated using a transformed pair of equirectangular images rotated with respect to the input pair to move polar regions in the input pair to central regions in the transformed pair.

20 Claims, 9 Drawing Sheets

(56) References Cited

OTHER PUBLICATIONS

Pathak, Sarthak, et al., "Distortion-Robust Spherical Camera Motion Estimation Via Dense Optical Flow", 2018 25th IEEE International Conference on Image Processing (ICIP), 5 pgs.

Apitzsch, A. et al., "Cubes3D: Neural Network based Optical Flow in Omnidirectional Image Scenes", arXiv preprint arXiv:1804.09004 (2018).

Brox, T. et al., "High Accuracy Optical Flow Estimation Based on a Theory for Warping", ECCV 2004.

Chang, J. et al., "Pyramid stereo matching network", Proceedings of the IEEE Conference on Computer Vision and Pattern Recognition (2018).

Coors, B. et al., "Spherenet: Learning spherical representations for detection and classification in omnidirectional images", Proceedings of the European Conference on Computer Vision (ECCV), 2018.

Cui, Z. et al., "Real-time dense mapping for self-driving vehicles using fisheye cameras", 2019 International Conference on Robotics and Automation (IRCA), IEEE 2019.

Dosovitskiy, A. et al., "Flownet: Learning optical flow with convolutional networks", Proceedings of the IEEE International Conference on Computer Vision; 2015.

Fleet, D. et al., "Optical flow estimation", Handbook of mathematical models in computer vision; Springer, Boston, MA, 2006; pp. 237-257.

Furnari, et al., "Affine covariant features for fisheye distortion local modeling", IEEE Transactions on Image Processing; 2017.

Furnari, et al., "Affine region detectors on the fisheye domain", IEEE International Conference on Image Processing (ICIP); 2014.

Hui, T. et al., "Liteflownet: A lightweight convolutional neural network for optical flow estimation", Proceedings of the IEEE conference on computer vision and pattern recognition; 2018.

Ilg, E. et al., "Flownet 2.0: Evolution of optical flow estimation with deep networks", IEEE Conference on Computer Vision and Pattern Recognition; pp. 2462-2470; 2017.

Ilg, E. et al., "Occlusions, motion and depth boundaries with a generic network for disparity, optical flow or scene flow estimation", Proceedings of the European Conference on Computer Vision (ECCV). 2018.

Kita, N., "Evaluation of the Viewpoint Shift for a Fisheye Lens based on Stereo Geometry", International Conference on Digital Image Computing: Techniques and Applications (DICTA), 2016.

Pixflow, retrieved online via https://github.com/facebook/surround360/tree/master/surround360_render/source/optical_flow on Aug. 6, 2020.

Ren, Z. et al., "Unsupervised deep learning for optical flow estimation", Thirty-First AAAI Conference on Artificial Intelligence; 2017.

Roxas, M. et al., "Variational Fisheye Stereo", IEEE Robotics and Automation Letters (2020).

Schneider, Johannes et al., "On the accuracy of dense fisheye stereo", IEEE Robotics and Automation Letters 1.1 (2016: pp. 227-234.

Shah, S. et al., "Depth estimation using stereo fish-eye lenses", Proceedings of 1st International Conference on Image Processing; vol. 2. IEEE, 1994.

Sun, D. et al., "Pwc-net: Cnns for optical flow using pyramid, warping, and cost volume", Proceedings of the IEEE Conference on Computer Vision and Pattern Recognition; 2018.

Sun, D. et al., "Secrets of optical flow estimation and their principles", 2010 IEEE computer society conference on computer vision and pattern recognition; IEEE, 2010.

Wang, K. et al., "MVDepthNet: real-time multiview depth estimation neural network", 2018 International Conference on 3D Vision (3DV). IEEE, 2018.

Wang, Y. et al., "Occlusion aware unsupervised learning of optical flow", Proceedings of the IEEE Conference on Computer Vision and Pattern Recognition; 2018.

Won, C. et al., "Omnimvs: End-to-end learning for omnidirectional stereo matching", Proceedings of the IEEE International Conference on Computer Vision (ICCV) 2019.

Won, C. et al., "Sweepnet: Wide-baseline omnidirectional depth estimation", 2019 International Conference on Robotics and Automation (ICRA), IEEE, 2019.

Mieloch, Dawid et al., "Immersive video depth estimation", MPEG, 2020.

Pourian, Niloufar and Oscar Nestares, "An End to End Framework to High Performance Geometry-Aware Multi-Scale Keypoint Detection and Matching in Fisheye Imag." 2019 IEEE International Conference on Image Processing (ICIP), IEEE, 2019.

Gao, Wenliang and Shaojie Shen, "Dual-fisheye omnidirectional stereo." 2017 IEEE/RSJ International Conference on Intelligent Robots and Systems (IROS). IEEE, 2017.

Netherlands Patent Office, "Decision regarding formal defects," issued in connection with Netherland Patent Application No. 2029657, dated Nov. 22, 2021, 4 pages. [Machine English Translation Included.].

Netherlands Patent Office, "Certificate of Patent," issued in connection with Netherland Patent Application No. 2029657, dated Jul. 7, 2023, 2 pages. [Machine English Translation Included.].

* cited by examiner

ACCURATE OPTICAL FLOW ESTIMATION IN STEREO PAIRS OF EQUIRECTANGULAR IMAGES

BACKGROUND

There is a growing interest in optical flow estimation between pairs of equirectangular images (i.e., equirectangular projection (ERP) images) as equirectangular images provide a wide field of view of a scene while not suffering from large lens distortion typically present in fisheye images. For example, equirectangular images are used in a wide variety of applications such as generating content for immersive viewing experiences, artificial reality (AR) applications, virtual reality (VR) applications, and others. Accurate optical flow estimation between a stereo pair of ERP images is critical as it has a direct impact on the quality of such applications. However, the task of optical flow estimation in equirectangular images is challenging due to a number of factors including the image distortion in the equirectangular images.

Currently, optical flow estimation in ERP images includes adopting convolutional neural network (CNN) operations from the regular image domain to sphere surfaces by changing the sampling locations of the convolutional kernels, directly projecting feature maps to the predefined global spheres along combining 3D encoder-decoder blocks to use global contexts for computing and regularizing the matching cost, and applying various combinations of architectures of CNNs to estimate pixel displacements depending on image regions with omnidirectional camera geometry. However, these techniques do not address losses in matching accuracy in ERPs. Other work includes enforcing epipolar constraints between the stereo ERP pairs as a post processing step, which requires point correspondences that are close to their actual matches and is not able to correct points that are far from their actual matches.

Therefore, there is an ongoing need for accurate estimation of optical flow maps throughout an ERP image that avoids artifacts in the optical flow maps. It is with respect to these and other considerations that the present improvements have been needed. Such improvements may become critical as the desire to provide optical flow results in equirectangular images becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
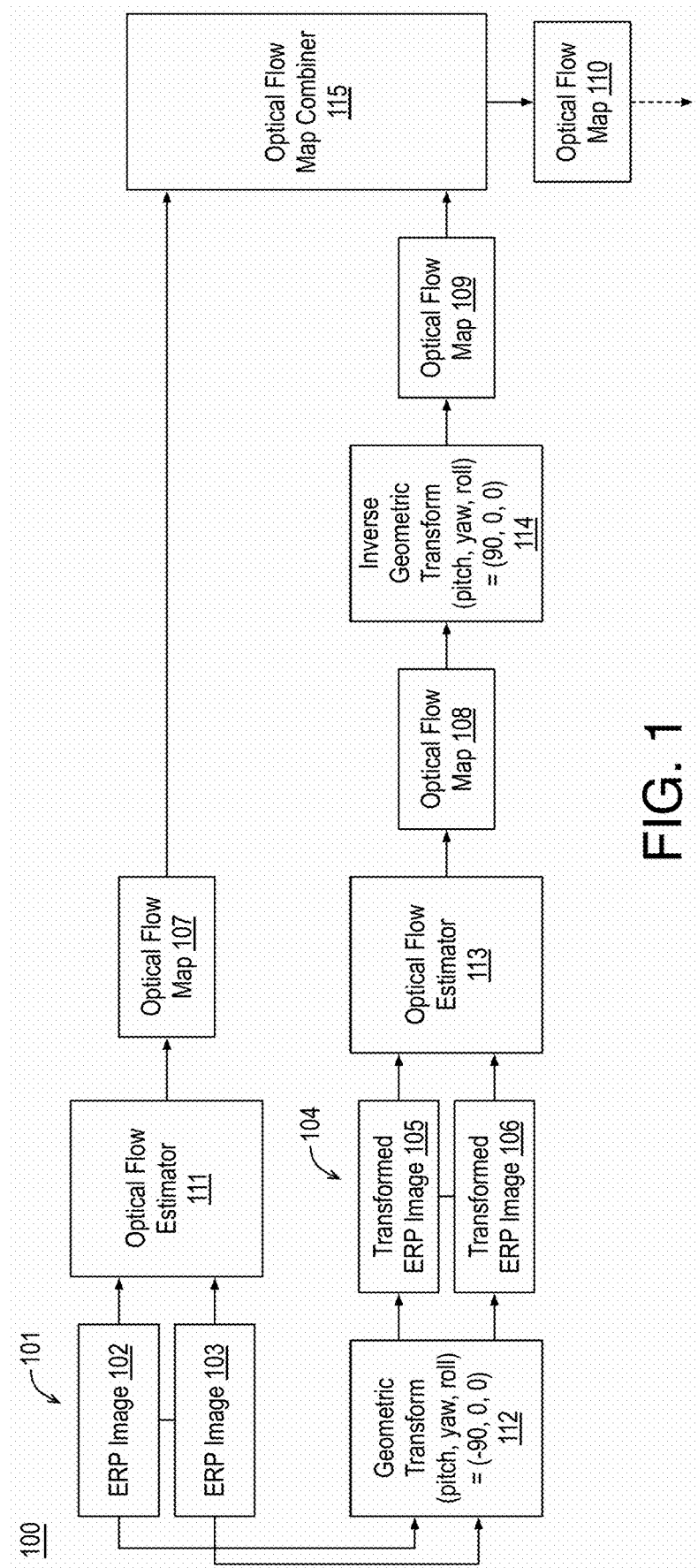
FIG. 1 illustrates an example system for generating an optical flow map for an input pair of equirectangular images based on multiple optical flow processing using the input pair and a reprojected input pair.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to generating accurate optical flow maps for an input pair of equirectangular images using a second pair of equirectangular images formed by projecting polar regions of the input pair to central regions of the second pair.

As described above, creating optical flow results between equirectangular image pairs is critical in a variety of contexts including imaging, artificial intelligence, virtual reality, artificial reality, and others. For example, optical flow techniques may be applied with respect to stereoscopy for the generation of an interpolated image between two images taken from cameras having different views (typically from the same vertical position but differing horizontal positions) of a scene. However, the discussed optical flow techniques may be employed in any context such as optical flow between equirectangular images or frames of a video sequence, or any other application. Herein, the term image may be used interchangeably with the terms picture and frame. For example, an image may include a three-channel representation of a scene including one channel for each color (e.g., RGB, YUV, etc.) for each pixel of the image. However, an image may be a single channel in some embodiments. Furthermore, the term equirectangular image indicates an image projected from a panoramic image attained via a panoramic imaging device such as a 360 image attained via a 360 camera arrays, a 360 camera, or a similar imaging device, a fisheye image captured via a camera outfitted with a fisheye lens. The terms equirectangular image and equirectangular projection (ERP) image are used interchangeably herein.

Notably, since the areas or image regions near the north and south poles (i.e., the top and bottom portions of the images) in the equirectangular images are stretched out, the task of optical flow estimation is challenging near the poles. The techniques discussed herein address the problem of estimating accurate optical flow map between a stereo pair of equirectangular (ERP) images, particularly near the poles. In some embodiments, in addition to the provided stereo ERP pair, a second stereo ERP pair is formed by projecting polar regions of the provided stereo ERP pair into a center region via a rotation operation, and optical flow maps are generated using both the original stereo ERP pair and the transformed stereo ERP pair. The optical flow map associated with the transformed stereo ERP pair is projected back via an inverse-rotation (i.e., inverse with respect to the rotation operation used to generate the transformed stereo ERP pair). A final or resultant optical flow map is formed by combining the central regions of optical flow map associated with the original stereo ERP pair and the polar regions of the optical flow map associated with the transformed stereo ERP pair after being projected back via the inverse rotation. Such techniques are beneficial as the stretch in polar regions are removed for optical flow estimation in the second pair and artifacts associated with such stretched image regions near the poles in the stereo ERP pair are avoided.

In some embodiments, a first optical flow map is generated for a pair of equirectangular images. The pair of equirectangular images are also projected (or reprojected) to a second pair of equirectangular images such that a polar region in each of a pair of equirectangular images are projected to a central region in each of the second pair of equirectangular images. As used herein, the term polar region indicates a region in an equirectangular image that begins at a top or bottom of the equirectangular image and extends into the center region by not more than ⅓ of the image. The term central region indicates a region that includes and surrounds a horizontal centerline of the equirectangular image and may include and surround both the horizontal centerline and the centerpoint of the equirectangular image. The central region may be any suitable fraction of the equirectangular image. In some embodiments, both polar regions are projected to a central region that extends from the left edge to the right edge of the equirectangular image.

A second optical flow map is then generated using the second pair of equirectangular images. Notably, the second optical flow map has fewer distortions in the reprojected polar region(s) (now in a center region) relative to the distortions in the polar regions for the original pair of equirectangular images. The second optical flow map is projected in an inverse manner (i.e., using an inverse rotation) relative to the projection used to generate the second pair of equirectangular images to provide a second optical flow map in the same coordinate system or having the same view relative to the first optical flow map. The first and second optical flow maps are then combined into a resultant optical flow map that includes the reprojected polar regions from the second optical flow map and the remainder (e.g., the central horizontal region) from the first optical flow map. The resultant optical flow map may be used any suitable context such as imaging, artificial intelligence, virtual reality, artificial reality, etc.

Such techniques are advantageous as they allow the use and corresponding benefits of any optical flow estimation techniques used for perspective content to be applied to ERP content while providing high quality optical flow maps in central regions as well as near the poles of the stereo ERP.

Furthermore, desired accuracy in the polar regions versus additional computational time associated with the optical flow estimation of the transformed pair may be adjusted by reducing the resolution (i.e., downsampling) of the transformed pair prior to the optical flow estimation.

FIG. 1 illustrates an example system 100 for generating an optical flow map for an input pair of equirectangular images based on multiple optical flow processing using the input pair and a reprojected input pair, arranged in accordance with at least some implementations of the present disclosure. As shown in FIG. 1, system 100 includes an optical flow estimator 111, a geometric transform module 112, an optical flow estimator 113, an inverse geometric transform module 114, and an optical flow map combiner 115. A final or resultant optical flow map 110 corresponding to an input pair 101 of equirectangular images 102, 103 is output for use by any other module, pipeline, or system such as view interpolation applications, artificial intelligence applications, virtual reality applications, artificial reality applications, image processing applications, computer vision applications, 3D scene perception applications, object tracking applications, and others.

System 100 may be implemented in any suitable device or grouping of devices. In some embodiments, system 100 is implemented via a server computer, a cloud computing environment, a personal computer, a laptop computer, a tablet, a phablet, a smart phone, a digital camera, a gaming console, a wearable device, a display device, a virtual reality headset, etc. In some embodiments, system 100 is implemented via a combination of such devices. In some embodiments, system 100 is coupled to one or more cameras to attain equirectangular images 102, 103 of a scene. Such cameras may be an array of cameras, a 360 camera array, a 360 camera, or the like. In other embodiments, system 100 receives equirectangular images 102, 103 from another device.

Equirectangular images 102, 103 define an input pair 101 and may include (along with other images discussed herein) any suitable image types or formats representative of equirectangular images such that, as discussed, the equirectangular images are projected from a panoramic 360 image attained of a scene. In some embodiments, equirectangular images 102, 103 each include a three-channel input including one channel for each color channel (e.g., RGB, YUV, etc.). Such equirectangular images 102, 103 may be characterized as pictures or frames. Equirectangular images 102, 103 may have any suitable resolution. For example, equirectangular images 102, 103 may have a resolution (H×W) of 1080×1920, 2048×4096, 2160×3840, or the like. In some embodiments equirectangular images 102, 103 are video pictures such as high definition (HD), Full-HD (e.g., 1080p), 4K resolution, or 8K resolution video pictures.

Input pair 101 of equirectangular images 102, 103 are related in some manner that makes determining an optical flow between them desirable. In some embodiments, equirectangular images 102, 103 are images from different views of a scene and resultant optical flow map 110 may be used to generate a depth image, disparity map, or other correspondence data that is in turn used to generate an interpolated image. In such contexts, equirectangular images 102, 103 may be characterized as a stereo pair. In other contexts, equirectangular images 102, 103 are sequential pictures or frames in a video sequence and final optical flow map 107 represents a motion vector field therebetween that may be used in video encoding for example.

Figure 2:
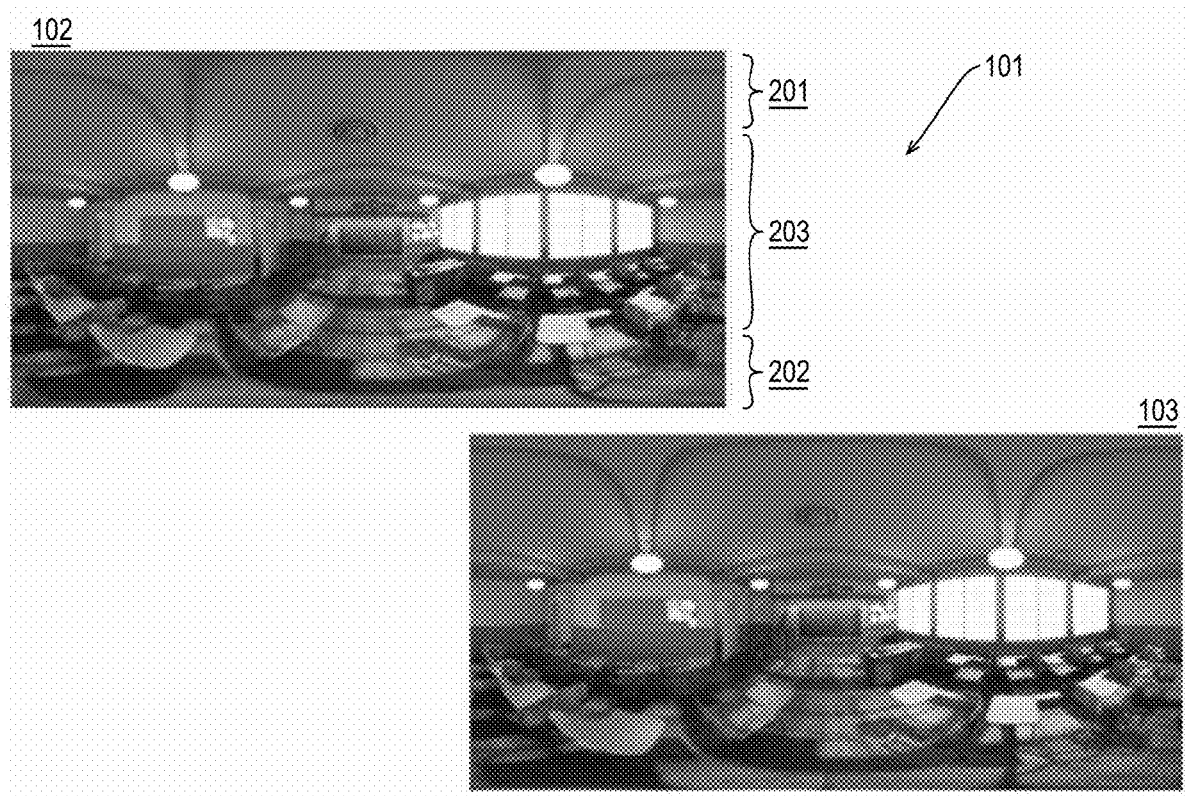
FIG. 2 illustrates an example input pair of example equirectangular images representative of an example scene.

FIG. 2 illustrates an example input pair 101 of example equirectangular images 102, 103 representative of an example scene, arranged in accordance with at least some implementations of the present disclosure. As shown in FIG. 2, equirectangular image 102 provides a first view of a scene (in this example a classroom though any scene may be used) and equirectangular image 103 provides a second view of the same scene either from a slightly different view (i.e., horizontally aligned views for stereoscopy) or at a different time instance. Also as shown, equirectangular images 102, 103 include projections of a 360 or panoramic view of the scene onto an image plane such that distortions of the scene are evident.

As shown with respect to equirectangular image 102, polar regions 201, 202 in particular have stretches due to distortions caused by the projections. For example, polar region 201 includes a region near a north pole of a 360 coordinate system corresponding to the 360 image (as discussed further herein below) with the north pole itself being centered at a top of equirectangular image 102. Similarly, polar region 202 includes a region near a south pole that is represented at a center bottom of equirectangular image 102. The same regions are included in equirectangular image 103. As discussed, such polar regions are defined in equirectangular images projected from a 360 image as extending from the top of the image toward the center of the image by a particular percentage of the height of the image and in the same manner from the bottom of the image such that the percentage is, for example, not more than 33%, not more than 25%, not more than 20%, or at least 15%. Remaining or central region 203 of equirectangular image 102 may be defined as a center horizontal strip or region and includes a central region of equirectangular image 102, which is defined as a region of equirectangular image 102 that includes and encompasses a center point of equirectangular image 102.

Returning to FIG. 1, equirectangular images 102, 103 are provided to and received by optical flow estimator 111. In some embodiments, equirectangular images 102, 103 may be downsampled and/or pre-processed prior to being received by optical flow estimator 111. As discussed herein below, equirectangular images 102, 103 both include the same projection geometry of a spherical or 360 image onto an image plane (although from different views or at different times). Optical flow estimator 111 performs optical flow estimation using any suitable technique or techniques to generate an optical flow map 107 using equirectangular images 102, 103. In some embodiments, deep learning based optical flow estimation is performed using an input volume including equirectangular images 102, 103. In some embodiments, optical flow estimator 111 employs a convolutional neural network (CNN) based optical flow network. As used herein, the term CNN indicates a pretrained deep learning neural network including an input layer, multiple hidden layers, and an output layer such that the hidden layers include one or more of convolutional layers each including at least a convolutional layer (and optionally including, for example, a leaky RELU layer, a pooling or summing layer, and/or a normalization layer).

Optical flow map 107 (and other optical flow maps discussed herein) may include any suitable data structure such as a motion vector for each pixel at a resolution of equirectangular images 102, 103 (or a resolution of downsampled versions of equirectangular images 102, 103). Other data structures such as motion vectors for a particular grouping of pixels (i.e., a motion vector for each 4×4 or 2×2 block of pixels) may be used. Furthermore, the term motion vector in the context of stereoscopy is used for convenience.

In such contexts, the motion vectors may be characterized as displacement vectors, displacement values, or the like.

Figure 3:
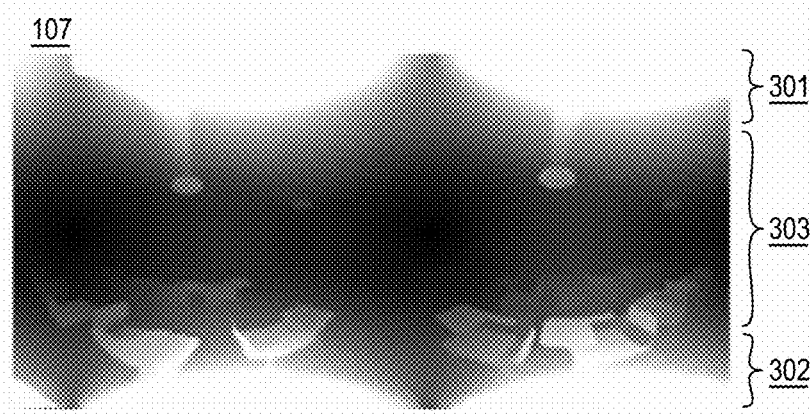
FIG. 3 illustrates an example optical flow map attained using the input pair of equirectangular images of FIG. 2.

FIG. 3 illustrates an example optical flow map 107 attained using input pair 101 of equirectangular images 102, 103, arranged in accordance with at least some implementations of the present disclosure. In FIG. 3 and elsewhere herein, optical flow maps are presented with brighter pixel values indicating position that are deemed closer to the camera used to attain the image of the scene (or a virtual camera position for rendered content) and darker pixel values indicating position that are deemed farther from the camera. In the context of optical flow map 107, polar regions 301, 302 (corresponding to polar regions 201, 202), show undesirably low resolution in polar regions 301, 302 (with such region being washed out). Notably, the optical flow results in remaining or central region 303 (corresponding to remaining or central region 203) indicate accurate results for the scene. However, the optical flow results in polar regions 301, 302 are not useable.

Returning to FIG. 1, equirectangular images 102, 103 are also provided to and received by geometric transform module 112, which generates a transformed pair 104 of transformed equirectangular images 105, 106 by projecting areas near the poles in equirectangular images 102, 103 to central regions of transformed equirectangular images 105, 106 and vice versa. Transformed equirectangular images 105, 106 may be generated from equirectangular images 102, 103 using any suitable technique or techniques. In the illustrated example, the geometric transform applies a change in pitch of −90° and no change in yaw or roll. In some embodiments, the points (e.g., pixel values) in equirectangular images 102, 103 projected to a world coordinate system, rotation parameters are applied, and transformed equirectangular images 105, 106 are formed by reprojecting from the rotated or adjusted points in the world coordinate system back to an image plane. In some embodiments, the points in equirectangular images 102, 103 are projected to points in the world coordinate system, appropriate rotation parameters are applied (e.g., (pitch, yaw, roll)=(−90, 0, 0), with pitch defining latitude), and transformed equirectangular images 105, 106 are formed.

Figure 4:
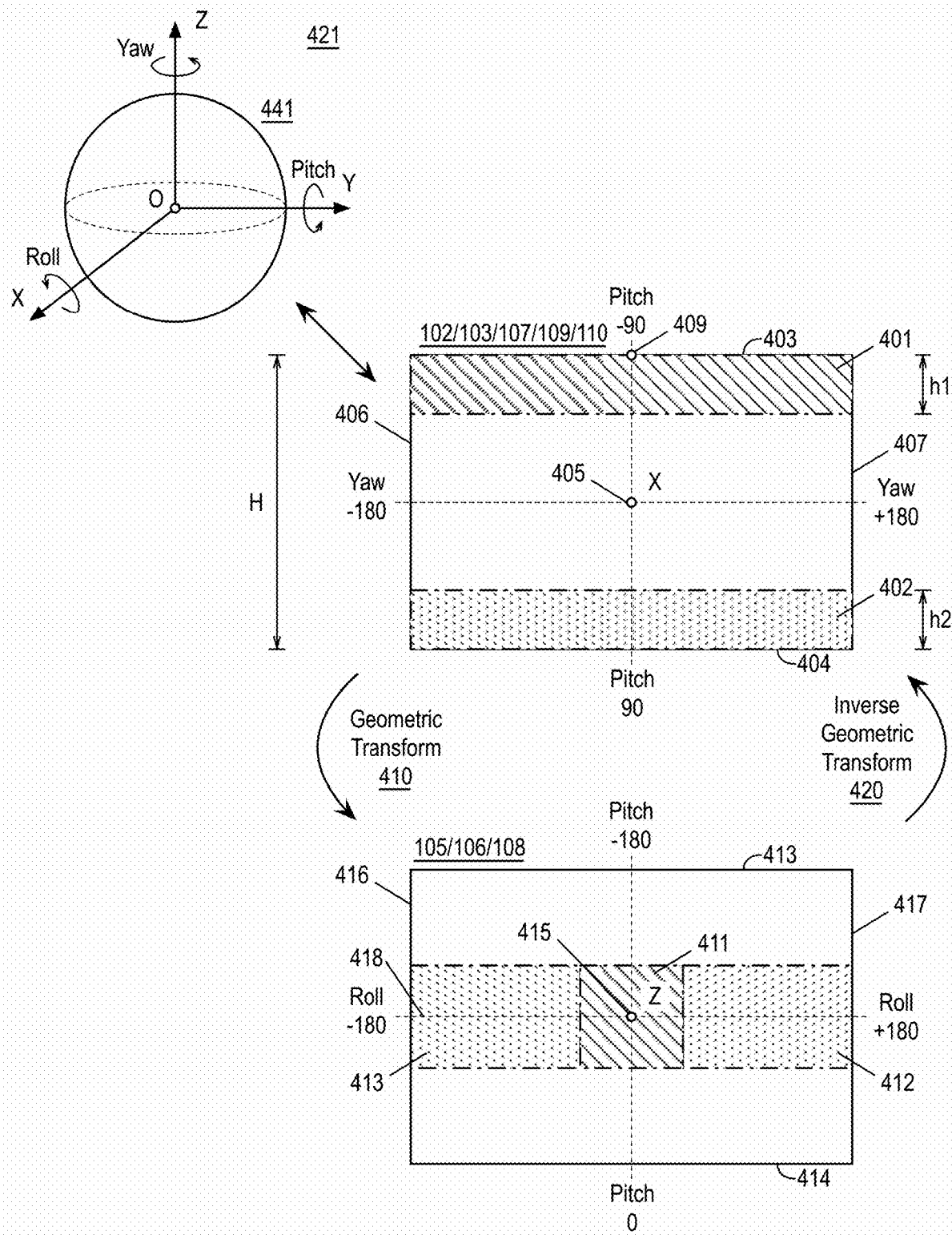
FIG. 4 illustrates an example world coordinate system and example geometric transformations of equirectangular images.

FIG. 4 illustrates an example world coordinate system 421 and example geometric transformations 410, 420 of equirectangular images, arranged in accordance with at least some implementations of the present disclosure. As shown in FIG. 4, a world coordinate system 421 is defined relative to a scene attained by a camera. World coordinate system 421 is also used to define and generate the image content of equirectangular images 102, 103, optical flow map 107, transformed equirectangular images 105, 106, and optical flow maps 108, 109, 110. In FIG. 4, each such image or flow map is labeled next to the suitable projection relative to world coordinate system 421.

World coordinate system 421 includes 6 degrees of freedom (DoF) as defined by translation (x, y, z) and rotation (yaw, pitch, roll). Such translation in world coordinate system 421 is defined by Cartesian coordinates based on an x-axis, a y-axis, and a z-axis, which intersect at origin O and rotation is defined by roll (rotation about the x-axis), pitch (rotation about the y-axis), and yaw (rotation about the z-axis). Herein, projection onto an image plane for the generation of equirectangular images is provided using a viewpoint from origin O and no translation is employed. In the context of FIG. 4, image or map characteristics are shared across equirectangular images 102, 103 and optical flow maps 107, 109, 110 as well as, separately, across transformed equirectangular images 105, 106 and optical flow map 108. In the following, discussion of such characteristics with respect to any image or optical map may be shared across other images or optical maps.

As shown, equirectangular images 102, 103 and optical flow maps 107, 109, 110 are defined or generated based on a viewpoint from origin O that provides a centerpoint 405 at a location where the x-axis intersects with a projection sphere 441 centered at origin O (as indicated by X in equirectangular images 102, 103 and optical flow maps 107, 109, 110). The corresponding projections in equirectangular images 102, 103 and optical flow maps 107, 109, 110 are defined or generated such that a top edge 403 corresponds to a pitch of −90° (i.e., the point the z-axis intersects with projection sphere 441), a bottom edge 404 corresponds to a pitch of 90° (i.e., the point the negative z-axis intersects with projection sphere 441), and the sphere is projected onto the image plane extending from −180° yaw (i.e., the point the negative x-axis intersects with projection sphere 441) at left edge 406 through an entire sweep of projection sphere 441 to +180° yaw (i.e., also the point the negative x-axis intersects with projection sphere 441) at a right edge 407.

Thereby, the entirety of the image corresponding to projection sphere 441 is contained (although distorted) within equirectangular images 102, 103 and optical flow maps 107, 109, 110. As discussed, equirectangular images 102, 103 and optical flow maps 107, 109, 110 include a north or top polar region 401 that extends from top edge 403 toward centerpoint 405 and from left edge 406 to right edge 407. Top polar region 401 has a height h1 that may be any suitable percentage of a total height H of equirectangular images 102, 103 and optical flow maps 107, 109, 110 such as not more than 33%, not more than 25%, or not more than 20% of total height H. In some embodiments, height h1 is not less than 15% of total height H. Similarly, equirectangular images 102, 103 and optical flow maps 107, 109, 110 include a south or bottom polar region 402 that extends from bottom edge 404 toward centerpoint 405 and from left edge 406 to right edge 407. Bottom polar region 402 also has a height h2 that may be any suitable percentage of a total height H of equirectangular images 102, 103 and optical flow maps 107, 109, 110 such as not more than 33%, not more than 25%, or not more than 20% of total height H. In some embodiments, height h2 is not less than 15% of total height H. Height h2 of bottom polar region 402 may be the same or different than height h1 of top polar region 402.

As discussed, top and bottom polar regions 401, 402 of optical flow map 107 include artifacts and/or incomplete data due to the distortion of top and bottom polar regions 401, 402 equirectangular images 102, 103. To rectify such problems, a geometric transform 410 is applied to equirectangular images 102, 103 to generate transformed equirectangular images 105, 106. Optical flow is applied to transformed equirectangular images 105, 106 (as discussed further below) to generate optical flow map 108, which is transformed via inverse geometric transform 420 to generate optical flow map 109. Optical flow maps 107, 109 are then combined to generate resultant optical flow map 110.

Geometric transform 410 may be performed using any suitable technique or techniques to project top polar regions 401 of equirectangular images 102, 103 and bottom polar regions 402 of equirectangular images 102, 103 to a horizontal centerline 418 in transformed equirectangular images 105, 106 and optical flow map 108. Notably, in transformed equirectangular images 105, 106 corresponding regions 411, 412, 413 (i.e., region 411 corresponding to top polar region 401 and regions 412, 413 corresponding to bottom polar region 402) include and encompass a horizontal centerline 418 and a centerpoint 415 of transformed equirectangular images 105, 106. For example, as discussed, transformed equirectangular images 105, 106 and optical flow map 108 include a center region or regions defined as including and encompassing at least horizontal centerline 418. Notably, in transformed equirectangular images 105, 106, such corresponding regions 411, 412, 413 do not suffer from as much distortion and reduced defects and improved accuracy in optical flow map 108 and, ultimately, resultant optical flow map 110 are attained.

In some embodiments, geometric transform 410 projecting top and bottom polar regions 401, 402 in equirectangular images 102, 103 to central regions of transformed equirectangular images 105, 106 includes projecting points (i.e., pixels) from each of equirectangular images 102, 103 to points in world coordinate system 421 (i.e., points on projection sphere 441), applying rotation parameters in world coordinate system 421 (i.e., to define a new viewpoint in world coordinate system 421), and reprojecting the rotated points to points of transformed equirectangular images 105, 106 (i.e., pixels).

For example, in the illustrated embodiment, equirectangular images 102, 103 may be projected to world coordinate system 421 (i.e., on projection sphere 441) using the inverse of definitions used to generate equirectangular images 102, 103. In world coordinate system 421, a new viewpoint may be defined such that the viewpoint is from origin O and defines transformed equirectangular images 105, 106 as follows. The defined viewpoint provides a centerpoint 415 at a location where the z-axis intersects with projection sphere 441 (as indicated by Z in transformed equirectangular images 105, 106 and optical flow map 108). The corresponding projections in transformed equirectangular images 105, 106 and optical flow map 108 are defined or generated such that a top edge 413 corresponds to a pitch of −180° (i.e., the point the negative x-axis intersects with projection sphere 441), a bottom edge 414 corresponds to a pitch of 0° (i.e., the point the x-axis intersects with projection sphere 441), and the sphere is projected onto the image plane extending from −180° roll (i.e., the point the negative z-axis intersects with projection sphere 441) at left edge 416 through an entire sweep of projection sphere 441 to +180° roll (i.e., also the point the negative z-axis intersects with projection sphere 441) at a right edge 417.

Although discussed with respect to such reprojection techniques, any suitable techniques may be used such as rotating projection sphere 441 after projection of the image using direct reprojection techniques (i.e., a mapping) between such projections, or the like. Notably, such reprojections translate a position 409 in equirectangular images 102, 103 that is centered at top edge 403 to or toward centerpoint 415 of transformed equirectangular images 105, 106. Furthermore, the image content of top edge 403 and bottom edge 404 are moved to or toward horizontal centerline 418. Although illustrated with respect to projecting position 409 to centerpoint 415, a position centered along bottom edge 404 may translated to centerpoint 415 instead (i.e., the opposite rotation direction may be used). Furthermore, in some embodiments, both rotation directions may be used to generate separate transformed pairs of transformed equirectangular images (i.e., transformed equirectangular images 105, 106 and another pair of transformed equirectangular images), optical flow may be separately performed, the results may be projected in an inverse manner and the three optical flow maps (i.e., optical flow map 107, optical flow map 109, and a third optical flow map generated using the opposite rotation with respect to that used to generate optical flow map 109) may be combined to generate optical flow map 110.

As shown in transformed equirectangular images 105, 106, geometric transform 410 provides a region 411 corresponding to top polar region 401 (i.e., including the same image data in a different format having less distortion) and regions 412, 413 corresponding to bottom polar region 402 (i.e., again including the same image data in a different format having less distortion) such that regions 411, 412, 413 are within a central region of transformed equirectangular images 105, 106 (i.e., region 411 including and encompassing both centerpoint 415 and horizontal centerline 418 and regions 412, 413 including and encompassing horizontal centerline 418). Although illustrated with respect to rectangular regions 411, 412, 413, regions 411, 412, 413 (as translated from top and bottom polar regions 401, 402) may include other shapes due to the transformation such as pincushion shapes or effects.

Figure 5:
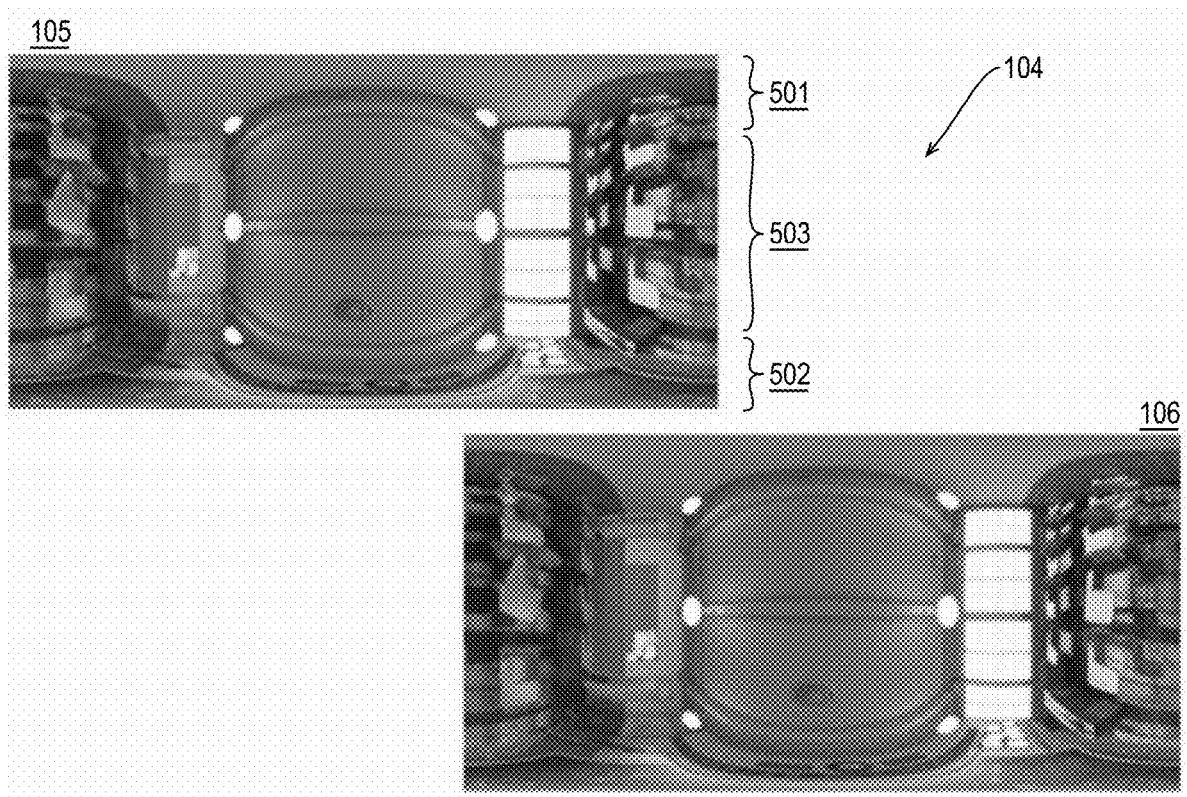
FIG. 5 illustrates an example transformed pair of example transformed equirectangular images attained based on a geometric transform of the example input pair of example equirectangular images of FIG. 2.

FIG. 5 illustrates an example transformed pair 104 of example transformed equirectangular images 105, 106 attained based on a geometric transform of example input pair 101 of example equirectangular images 102, 103, arranged in accordance with at least some implementations of the present disclosure. As shown in FIG. 5, transformed equirectangular images 105, 106 provide a view of the scene now centered on the ceiling of the classroom (i.e., the top or north pole) and wrapping horizontally in transformed equirectangular images 105, 106 to the bottom or south pole imagery on both the left and right sides of transformed equirectangular images 105, 106.

As with equirectangular images 102, 103, transformed equirectangular image 105 provides a first view of the scene and transformed equirectangular images 106 provides a second view of the same scene either from a slightly different view (for stereoscopy) or at different time instances. As shown with respect to transformed equirectangular image 105, center region 503 (relative to polar regions 201, 202 as shown in FIG. 2) depicts polar image data with much less distortion for improved optical flow performance. In transformed equirectangular images, 105, 106, it is the previously centered regions as illustrated with respect to top region 501 and bottom region 502 that are now heavily distorted by stretching.

Returning now to FIG. 1, transformed equirectangular images 105, 106 are provided to and received by optical flow estimator 113. In some embodiments, particularly when computational resources of system 100 are low, transformed equirectangular images 105, 106 may be downsampled and/or pre-processed prior to being received by optical flow estimator 113. For example, transformed equirectangular images 105, 106 may be downsampled by two or four in each of the horizontal and vertical dimensions prior to processing by optical flow estimator 113. Optical flow estimator 113 performs optical flow estimation using any suitable technique or techniques to generate an optical flow map 108 using transformed equirectangular images 105, 106. The optical flow estimation performed by optical flow estimators 111, 113 may be the same or it may be different. In some embodiments, deep learning based optical flow estimation (i.e., employing a CNN) is performed using an input volume including transformed equirectangular images 105, 106. Optical flow map 108 may include any suitable data structure discussed herein. As shown with respect to 4, optical flow map 108 has the same perspective and has the same geometry as transformed equirectangular images 105, 106.

Figure 6:
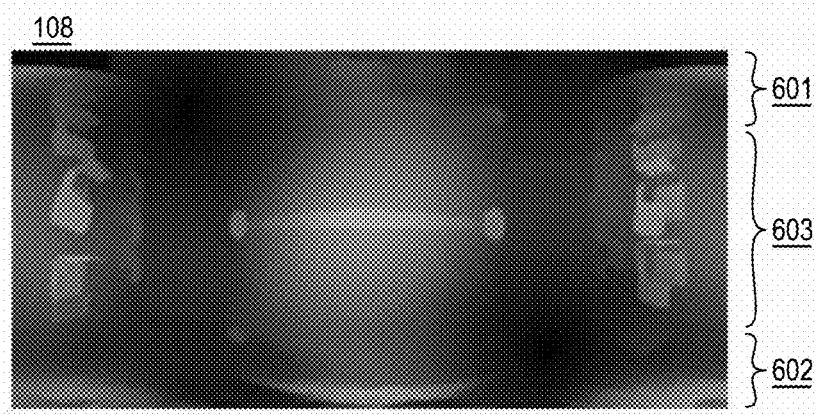
FIG. 6 illustrates an example optical flow map in the transformed geometry attained using example transformed equirectangular images of FIG. 5.

FIG. 6 illustrates an example optical flow map 108 in the transformed geometry attained using example transformed equirectangular images 105, 106, arranged in accordance with at least some implementations of the present disclosure. As shown in FIG. 6, in region 603, which includes or corresponds to polar regions 301, 302 in FIG. 3, has an improved optical flow estimation map and few defects particularly when compared with the polar regions 301, 302 of optical flow map 107 as illustrated in FIG. 3. In the context of FIG. 6, top region 601 and bottom region 602 now have reduced accuracy and higher defect levels. However, it is noted that the image portion represented by top region 601 and bottom region 602 previously had robust optical flow results generated in optical flow map 107.

Returning again to FIG. 1, optical flow map 108 goes through an inverse geometric transformation to map the optical flow estimates back to the original geometry and image coordinates corresponding to equirectangular images 102, 103 as well as optical flow map 107. Therefore, optical flow map 108 is provided to and received by inverse geometric transform module 114, which applies an inverse geometric transform (e.g., (pitch, yaw, roll)=(90, 0, 0) relative to the geometric transform (e.g., (pitch, yaw, roll)=(−90, 0, 0) applied by geometric transform module 112 to generate optical flow map 109. The inverse geometric transform may be applied using any suitable technique or techniques. In some embodiments, the inverse geometric transform applies a change in pitch of +90° and no change in yaw or roll. Although discussed with respect to +/−90° transforms, other changes in pitch that relocate polar regions to a central image region may be used such as rotation and inverse rotations in the range of 80° to 90°, rotation and inverse rotations in the range of 75° to 90°, or rotation and inverse rotations in the range of 75° to 90°.

In some embodiments, the points (e.g., motion or displacement vector values) in optical flow map 108 are projected to a world coordinate system, the appropriate inverse rotation parameters are applied, and optical flow map 109 is formed by reprojecting from the rotated or adjusted points in the world coordinate system back to an image plane. With reference to FIG. 4, inverse geometric transform module 114 may apply inverse geometric transform 420, which returns optical flow map 108 to the geometry and orientation of equirectangular images 102, 103 (and optical flow map 107) by applying the discussed +90° pitch rotation, which again provides a view taken along the x-axis in world coordinate system 421. Notably, the motion or displacement vector values generated (largely with defects) via optical flow estimation as applied to transformed equirectangular images 105, 106 for regions 411, 412, 413 are projected back to corresponding top polar region 401 and bottom polar region 402 in optical flow map 109.

Figure 7:
FIG. 7 illustrates an example optical flow map generated using the example transformed equirectangular images of FIG. 5 after transformation to the geometry of the example input equirectangular images of FIG. 2.

FIG. 7 illustrates an example optical flow map 109 generated using example transformed equirectangular images 105, 106 after transformation to the geometry of example equirectangular images 102, 103, arranged in accordance with at least some implementations of the present disclosure. As shown in FIG. 7, in top polar region 701 and bottom polar region 703, which include the optical flow data from central region 603 (please refer to FIG. 6) projected to polar regions 701, 703 has improved resolution and few defects particularly when compared with the resolution and defect level in polar regions 301, 302 of optical flow map 107 as illustrated in FIG. 3. It is noted that in optical flow map 109, central region 702 has additional defects and lack of resolution as being transformed from regions 601, 602 in optical flow map 108.

Returning once again to FIG. 1, optical flow map 107 and optical flow map 109 are provided to and received by optical flow map combiner 115, which combines optical flow map 107 and optical flow map 109 to generate resultant optical flow map 110. Notably, accurate optical flow estimates for each region are provided by one of optical flow map 107 and optical flow map 109. Resultant optical flow map 110 may be generated from optical flow map 107 and optical flow map 109 using any suitable technique or techniques. In some embodiments, a central horizontal region or strip is retrieved from optical flow map 107 and top and bottom polar regions or strips are retrieved from optical flow map 109. The retrieved regions or strips are then combined to generate resultant optical flow map 110. In some embodiments, filtering (e.g., median filtering) may be performed across the seam between the retrieved regions or strips to smooth the edge therebetween. The top and bottom polar regions or strips retrieved from optical flow map 109 for use in resultant optical flow map 110 may have any suitable size discussed herein. In some embodiments, each of the top polar region and the bottom polar region have a height of not less than 15% of the height of resultant optical flow map 110. In some embodiments, each of the top polar region and the bottom polar region have a height of 20% of the height of resultant optical flow map 110.

Furthermore, although discussed with respect to two optical flow estimations, three or more optical flow estimations may be employed and regions of the resultant optical flow maps may be combined (e.g., stitched together). In some embodiments, the top polar region is moved to the center for one optical flow estimation (and a subsequent inversion is applied), the bottom polar region is moved to the center for a second optical flow estimation (and a subsequent inversion is applied), and the three optical flow maps (i.e., optical flow map 107, optical flow map 109, and an optical flow map for the bottom polar region) are combined. In some embodiments, a top horizontal strip of resultant optical flow map 110 includes a top horizontal strip of optical flow map 109, a middle or central horizontal strip of resultant optical flow map 110 includes a middle or central horizontal strip of optical flow map 107, and a bottom horizontal strip of resultant optical flow map 110 includes a bottom horizontal strip of the optical flow map generated based on centering the bottom polar region.

Figure 8:
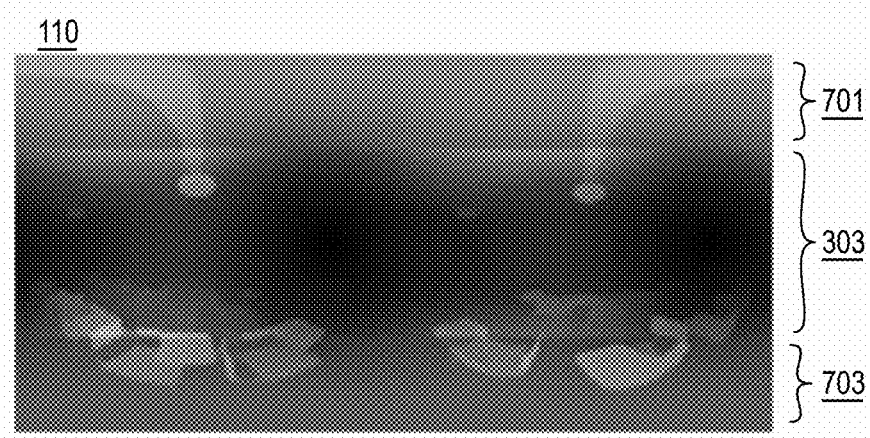
FIG. 8 illustrates an example resultant optical flow map for the example input pair of equirectangular images of FIG. 2.

FIG. 8 illustrates an example resultant optical flow map 110 for example input pair of equirectangular images 102, 103, arranged in accordance with at least some implementations of the present disclosure. As shown in FIG. 8, resultant optical flow map 110 includes top polar region 701 from optical flow map 109 (e.g., the top one-fifth of optical flow map 109), bottom polar region 703 from optical flow map 109 (e.g., the bottom one-fifth of optical flow map 109), and central 303 from optical flow map 107 (e.g., the middle three-fifths of optical flow map 107). Notably, resultant optical flow map 110 provides accurate, high resolution, and low defect optical flow data for all regions thereof.

Resultant optical flow map 110 may be employed in any suitable context including computer vision applications. For example, computer vision applications involved in analyzing multi-view images benefit from accurate optical flow estimations. The techniques discussed herein may be integrated as part of a 3D scene perception application for autonomous vehicles, in object tracking algorithms for surveillance systems, etc. Other applications for resultant optical flow map 110 including generating immersive AR or VR content in 360 camera arrays or 360 cameras. Furthermore, resultant optical flow map 110 may be used to define depth maps as the base for generating novel views in omni-directional imaging to allow for 6 degrees of freedom from a limited set of camera captured with fisheye lenses.

Figure 9:
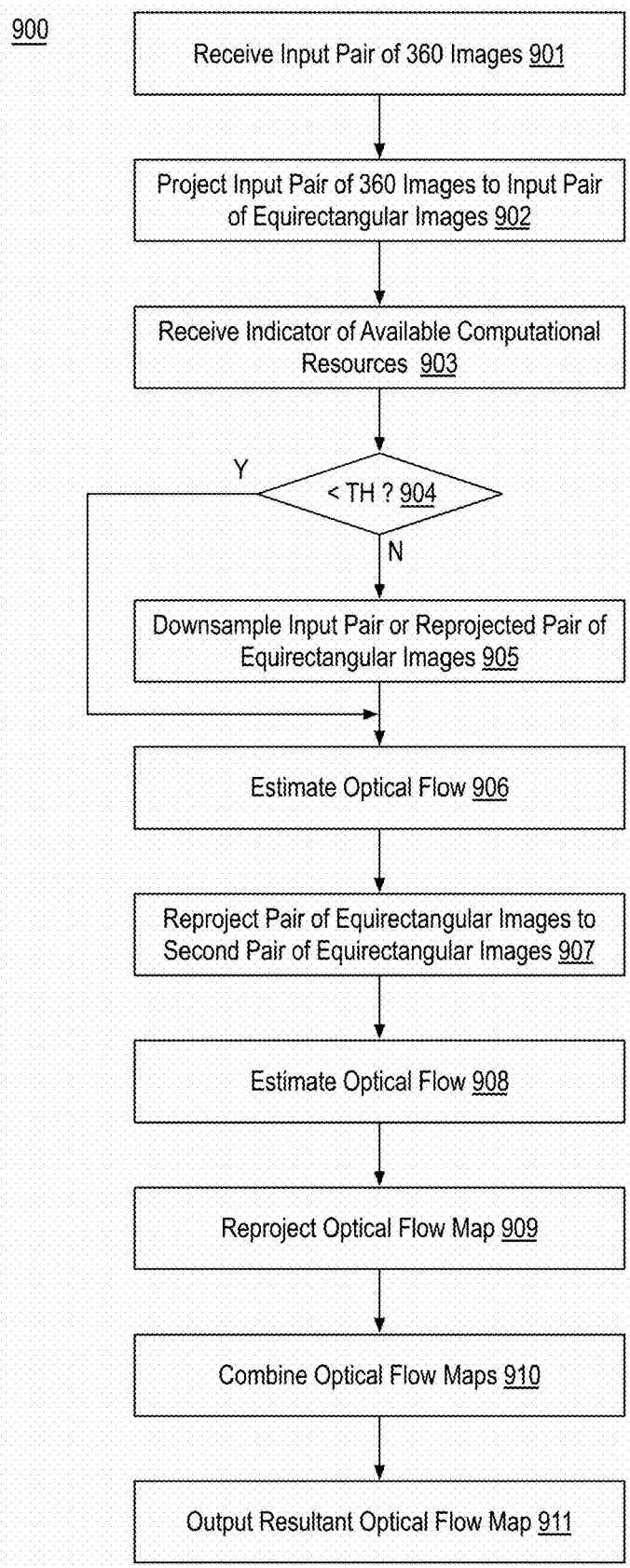
FIG. 9 illustrates an exemplary process for estimating optical flow for equirectangular image pairs including adaptive processing based on available computational resources.

FIG. 9 illustrates an exemplary process 900 for estimating optical flow for equirectangular image pairs including adaptive processing based on available computational resources, arranged in accordance with at least some implementations of the present disclosure. For example, process 900 may be performed by system 100 to generate a high quality optical flow map for equirectangular image pairs.

Process 900 begins at operation 901, where an input pair of 360 images or image data representative of 360 images or any suitable panoramic images are received for processing. Such images may be received from a camera, camera array, or memory storage.

Processing continues at operation 902, where the input pair of images are projected to an input pair of equirectangular images. Such projection may be performed using any suitable technique or techniques such as those discussed with respect to the projection of equirectangular images 102, 103 as discussed with respect to FIG. 4. Furthermore, the equirectangular images generated at operation 902 may have any characteristics discussed with respect to equirectangular images 102, 103. In some embodiments, equirectangular images are received for processing and operation 902 may be skipped.

Processing continues at operation 903, where an indicator of available computational resources is received. The indicator (or multiple indicators) may have any suitable data structure relevant to computational resources (inclusive of power level availability) for use in generating an optical flow map for the equirectangular images generated at operation 902 (or attained for processing). In some embodiments, the indicator provides computational resource level (i.e., with higher values indicating more available resources). In some embodiments, the indicator or indicators provides a number of available processing cores, a percentage of available processor resources, a memory resource limit, or the like. Any such indicator or indicators capable of estimating whether full optical flow map can be achieved with available computational resources of the system being employed may be used.

Processing continues at decision operation 904, where a determination is made as to whether the computational resources indicated at operation 903 (or derived from such indicators) compares unfavorably to a threshold amount of computational resources. As used herein, the term compares unfavorably indicates the computational resources do not meet the minimum required for the processing and the term compares favorably indicates the computational resources do meet the minimum required for the processing.

If not, processing continues at operation 905, where the input pair of equirectangular images or a transformed pair of equirectangular images (generated as discussed with respect to operation 907) are downsampled to reduce the computational complexity required to generate an optical flow map. In some embodiments, such downsampling is performed on the input pair prior to optical flow estimation and reprojection to the transformed equirectangular images. Such embodiments may advantageously provide more reduction in computation complexity at the cost of reduced quality. In some embodiments, such downsampling is performed only for the transformed equirectangular images (either before or after reprojection). Such embodiments may advantageously provide more accuracy (particularly in the central regions of the input pair) at the at the cost of less reduction in computation complexity. In some embodiments, multiple thresholds may be employed such that a high level of computational resources uses no downsampling, a middle level of computational resources uses only downsampled transformed equirectangular images, and a low level of computational resources uses both downsampled equirectangular images and downsampled transformed equirectangular images. In some embodiments, if the computational resources indicated at operation 903 (or derived from such indicators) compares favorably to the threshold processing bypasses operation 905.

Processing continues at operation 906, where optical flow is estimated using the input or original pair of equirectangular images (downsampled or not) to generate a first optical flow map. The optical flow may be estimated using any techniques discussed herein such as application of a CNN.

Processing continues at operation 907, where the input or original pair of equirectangular images (downsampled or not) are reprojected to a second pair of equirectangular images (i.e., a transformed pair of equirectangular images). The reprojection may be performed using any techniques discussed herein. For example, the original pair of equirectangular images may both be reprojected to project polar regions therein to central regions in the transformed equirectangular images.

Processing continues at operation 908, where optical flow is estimated using transformed pair of equirectangular images (downsampled or not) to generate a second optical flow map. The optical flow may be estimated using any techniques discussed herein such as application of a CNN. As discussed, in some embodiments, operations 907, 908 may be performed using other reprojections to generate an additional optical flow map or additional optical flow maps. For example, one reprojection and optical flow map pairing may reproject a north pole in the original pair of equirectangular images to a center position in a first transformed pair of equirectangular images, which are used to generate a first optical flow map, and a second reprojection and optical flow map pairing may reproject a south pole in the original pair of equirectangular images to a center position in a second transformed pair of equirectangular images, which are used to generate a second optical flow map. In such contexts, both the first and second optical flow maps are reprojected and combined.

Processing continues at operation 909, where the optical flow map (in the transformed geometry) generated at operation 908 is reprojected to the original geometry of the input or original pair of equirectangular images. Such reprojection may be performed using any suitable technique or techniques that provides and inverse operation relative to that of operation 907 such as those discussed herein with respect to FIG. 4. In examples where multiple projections are used at operation 907 to determine multiple optical flow maps at operation 908, multiple inverse reprojections (each inverse with respect to the reprojection used to generate it) are employed.

Processing continues at operation 910, where the optical flow maps generated at operations 906, 908, 909 are combined to form a final or resultant optical flow map. As discussed, the final optical flow map includes the portions of the optical flow maps estimated with those portions at the center. For example, the final optical flow map may include a central horizontal strip from the optical flow map generated at operation 906 and a top and bottom horizontal strip from a single optical flow map generated at operations 908, 909 or a top horizontal strip from a first optical flow map generated at operations 908, 909 (formed by reprojection of a north polar region to a central region) and a bottom horizontal strip from a second optical flow map generated at operations 908, 909 (formed by reprojection of a south polar region to a central region).

Processing continues at operation 911, where the resultant or final optical flow map is output for additional processing. The resultant or final optical flow map may be provided to any suitable module, application or pipeline for any suitable processing. For example, the resultant or final optical flow map may be output for use in a view interpolation applications, artificial intelligence, virtual reality, artificial reality, image processing, computer vision, 3D scene perception, object tracking, or others.

Figure 10:
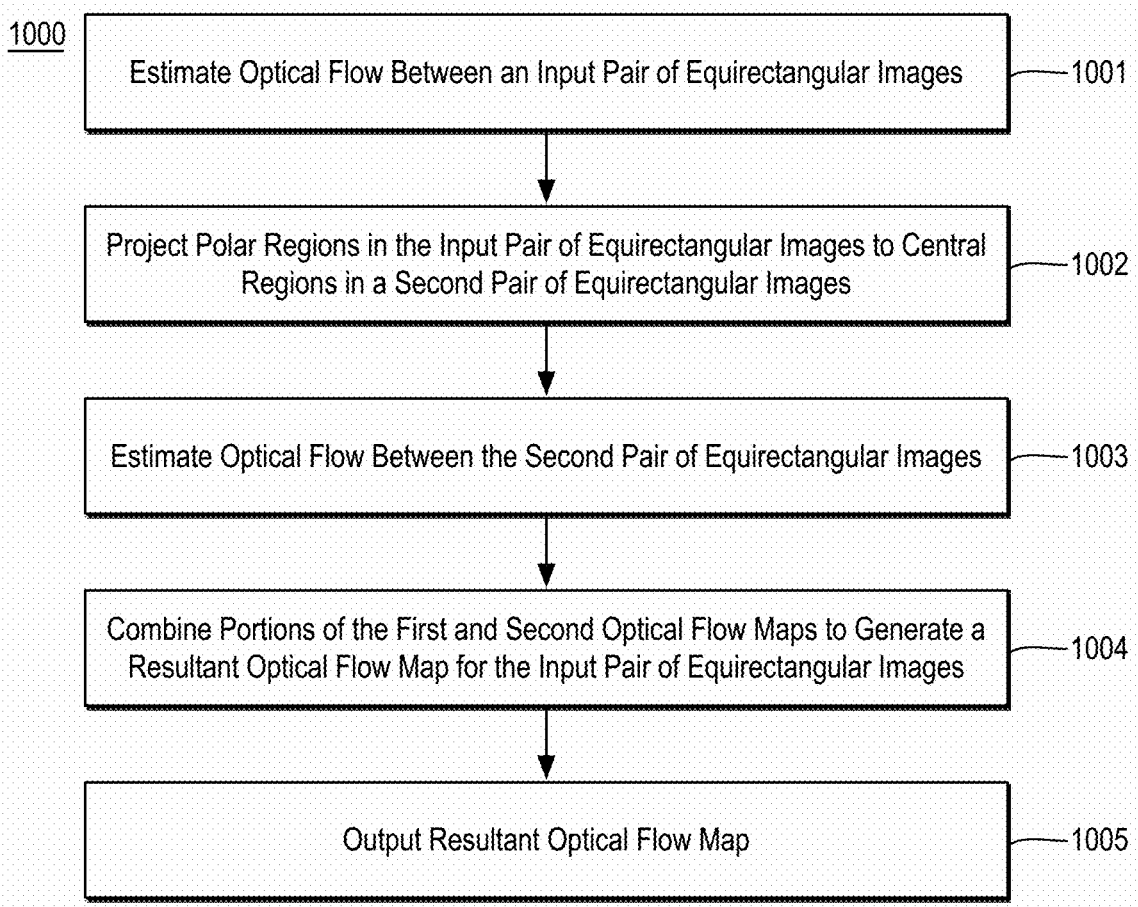
FIG. 10 is a flow diagram illustrating an example process for estimating optical flow for equirectangular image pairs.

FIG. 10 is a flow diagram illustrating an example process 1000 for estimating optical flow for equirectangular image pairs, arranged in accordance with at least some implementations of the present disclosure. Process 1000 may include one or more operations 1001-1005 as illustrated in FIG. 10. Process 1000 may form at least part of an optical flow process or pipeline. By way of non-limiting example, process 1000 may form at least part of an optical flow process for equirectangular image pairs performed by system 100 as discussed herein. Furthermore, process 1000 will be described herein with reference to system 1100 of FIG. 11.

Figure 11:
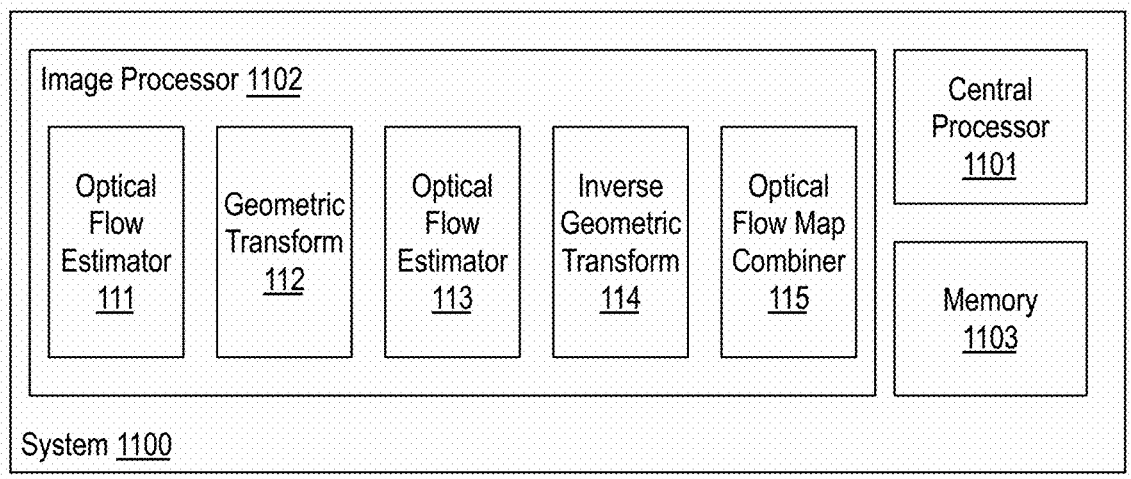
FIG. 11 is an illustrative diagram of an example system for estimating optical flow for equirectangular image pairs.

FIG. 11 is an illustrative diagram of an example system 1100 for estimating optical flow for equirectangular image pairs, arranged in accordance with at least some implementations of the present disclosure. As shown in FIG. 11, system 1100 may include a central processor 1101, an image processor 1102, and a memory 1103. Also as shown, image processor 1102 may include or implement one or more of optical flow estimator 111, geometric transform module 112, optical flow estimator 113, inverse geometric transform module 114, and optical flow map combiner 115. In the example of system 1100, memory 1103 may store equirectangular image data, transformed equirectangular image data, optical flow maps, geometric transform parameters, or any other data discussed herein.

As shown, in some examples, one or more or portions of optical flow estimator 111, geometric transform module 112, optical flow estimator 113, inverse geometric transform module 114, and optical flow map combiner 115 are implemented via image processor 1102. In other examples, one or more or portions of optical flow estimator 111, geometric transform module 112, optical flow estimator 113, inverse geometric transform module 114, and optical flow map combiner 115 are implemented via central processor 1101, an image processing unit, an image processing pipeline, an image signal processor, a graphics processor, a graphics processing unit, or the like. In some examples, one or more or portions of optical flow estimator 111, geometric transform module 112, optical flow estimator 113, inverse geometric transform module 114, and optical flow map combiner 115 are implemented in hardware as a system-on-a-chip (SoC). In some examples, one or more or portions of optical flow estimator 111, geometric transform module 112, optical flow estimator 113, inverse geometric transform module 114, and optical flow map combiner 115 are implemented in hardware via a FPGA.

Image processor 1102 may include any number and type of image or graphics processing units that may provide the operations as discussed herein. Such operations may be implemented via software or hardware or a combination thereof. For example, image processor 1102 may include circuitry dedicated to manipulate and/or analyze images obtained from memory 1103. Central processor 1101 may include any number and type of processing units or modules that may provide control and other high level functions for system 1100 and/or provide any operations as discussed herein. Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory.

In an embodiment, one or more or portions of optical flow estimator 111, geometric transform module 112, optical flow estimator 113, inverse geometric transform module 114, and optical flow map combiner 115 are implemented via an execution unit (EU) of image processor 1102. The EU may include, for example, programmable logic or circuitry such as a logic core or cores that may provide a wide array of programmable logic functions. In an embodiment, one or more or portions of optical flow estimator 111, geometric transform module 112, optical flow estimator 113, inverse geometric transform module 114, and optical flow map combiner 115 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 10, process 1000 begins at operation 1001, where optical flow is estimated between an input pair of equirectangular images to generate a first optical flow map. The optical flow estimation may be performed using any suitable technique or techniques. In some embodiments, estimating the optical flow between the input pair of equirectangular images comprises application of a convolutional neural network. The input pair of equirectangular images may include a representation of any scene attained via any source such as a 360 camera or 360 camera array. The geometric projection represented by the input pair of equirectangular images may be any suitable projection such as a projection along a horizontal axis extending from an origin located at the camera location or virtual camera location used to attain the image data.

Processing continues at operation 1002, where polar regions in the input pair of equirectangular images are projected to central regions in a second pair of equirectangular images. The polar regions in the input pair of equirectangular images may be projected to central regions in a second pair of equirectangular images using any suitable technique or techniques. For example the second pair of equirectangular images may have a projection along a vertical axis extending from an origin located at the camera location or virtual camera location used to attain the image data.

In some embodiments, projecting the polar regions in the input pair of equirectangular images to the central regions of the second pair of equirectangular images includes projecting points from each of the input pair of equirectangular images to points in a world coordinate system, applying rotation parameters in the world coordinate system, and reprojecting the rotated points to points of the second pair of equirectangular images. In some embodiments, applying the rotation parameters in the world coordinate system comprises translation of a position on a top or bottom image boundary corresponding to an edge of the polar regions in the input pair of equirectangular images to a horizontal centerline of the second pair of equirectangular images. In some embodiments, applying the rotation parameters in the world coordinate system comprises applying a 90° rotation in the world coordinate system relative to an axis in the world coordinate system.

Processing continues at operation 1003, where optical flow is estimated between the second pair of equirectangular images to generate a second optical flow map. The optical flow estimation may be performed using any suitable technique or techniques. In some embodiments, estimating the optical flow between the second pair of equirectangular images includes application of a convolutional neural network.

Processing continues at operation 1004, where regions of the first and second optical flow maps are combined to generate a resultant optical flow map for the input pair of equirectangular images. The regions of the first and second optical flow maps may be combined using any suitable technique or techniques. In some embodiments, projecting the polar regions in the input pair of equirectangular images to the central regions of the second pair of equirectangular images (at operation 1002) includes a rotation in a world coordinate system corresponding to the input pair of equirectangular images and the second pair of equirectangular images and combining the portions of the first and second optical flow maps includes applying an inverse rotation relative to the rotation to the second optical flow map. In some embodiments, the resultant optical flow map includes a central horizontal strip from the first optical flow map and top and bottom horizontal strips reprojected from the second optical flow map. In some embodiments, a height of the top horizontal strip comprises not less than 15% of a total height of the resultant optical flow map.

In some embodiments, process 1000 further includes projecting second polar regions in the input pair of equirectangular images to central regions in a third pair of equirectangular images and estimating optical flow between the third pair of equirectangular images to generate a third optical flow map, such that the resultant optical flow map for the input pair of equirectangular images comprises a combination of the first, second, and third optical flow maps.

In some embodiments, process 1000 further includes receiving an indicator of available computational resources for processing a received pair of equirectangular images and downsampling the second pair of equirectangular images prior to said estimation of optical flow between the second pair of equirectangular images in response to the indicator comparing unfavorably to a threshold. In some embodiments, the input pair of equirectangular images is downsampled images in response to the indicator comparing unfavorably to a threshold prior to estimating optical flow between the input pair and projecting polar regions in the input pair of equirectangular images to central regions in a second pair of equirectangular images.

Processing continues at operation 1005, where the resultant is output for use by another module, pipeline, or application. The resultant optical flow map may be provided to any suitable module pipeline, or application In various embodiments, the resultant optical flow map is output for use by one or more of in a view interpolation module, pipeline, or application, an artificial intelligence module, pipeline, or application, a virtual reality module, pipeline, or application, an artificial reality module, pipeline, or application, an image processing module, pipeline, or application, a computer vision module, pipeline, or application, a 3D scene perception module, pipeline, or application, or an object tracking module, pipeline, or application.

Process 1000 may be repeated any number of times either in series or in parallel for any number of equirectangular image pairs, sets of equirectangular images, or the like. Process 1000 may be implemented by any suitable device(s), system(s), or platform(s) such as those discussed herein. In an embodiment, at least a portion of process 1000 is implemented by a device having a memory to store data corresponding to input images, as well as any other discussed data structure, and one or more processors to perform any of operations 1001-1005. In an embodiment, the memory and a processor are implemented via a monolithic field programmable gate array integrated circuit. As used herein, the term monolithic indicates a device that is discrete from other devices, although it may be coupled to other devices for communication and power supply. In some embodiments, the memory and one or more processors are implemented in different devices.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
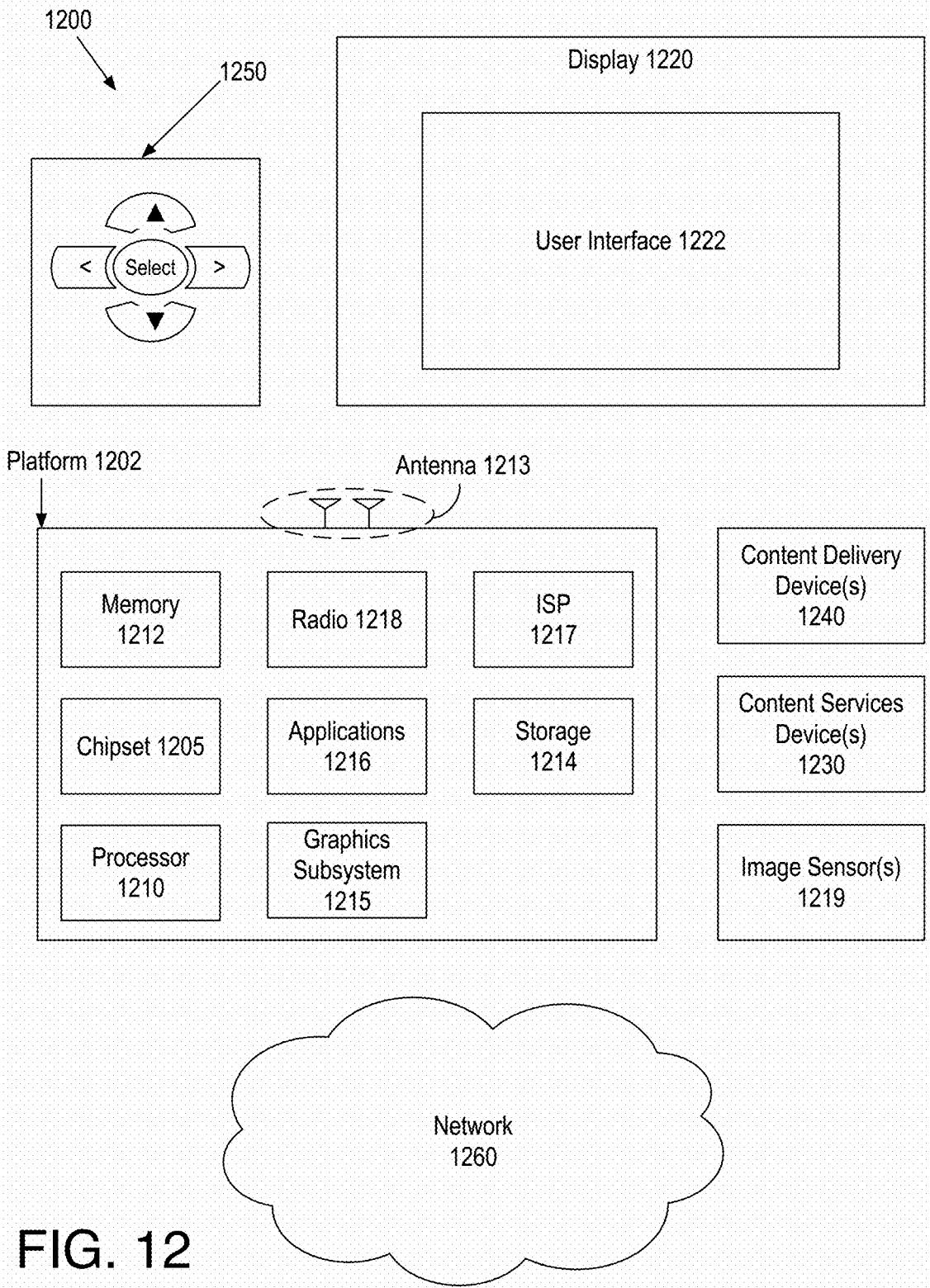
FIG. 12 is an illustrative diagram of an example system.

FIG. 12 is an illustrative diagram of an example system 1200, arranged in accordance with at least some implementations of the present disclosure. In various implementations, system 1200 may be a mobile device system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth. System 1200 may perform any techniques and/or implement any modules or components discussed herein.

In various implementations, system 1200 includes a platform 1202 coupled to a display 1220. Platform 1202 may receive content from a content device such as content services device(s) 1230 or content delivery device(s) 1240 or other content sources such as image sensors 1219. For example, platform 1202 may receive image data as discussed herein from image sensors 1219 or any other content source. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216, image signal processor 1217 and/or radio 1218. Chipset 1205 may provide intercommunication among processor 1210, memory 1212, storage 1214, graphics subsystem 1215, applications 1216, image signal processor 1217 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Image signal processor 1217 may be implemented as a specialized digital signal processor or the like used for image processing. In some examples, image signal processor 1217 may be implemented based on a single instruction multiple data or multiple instruction multiple data architecture or the like. In some examples, image signal processor 1217 may be characterized as a media processor. As discussed herein, image signal processor 1217 may be implemented based on a system on a chip architecture and/or based on a multi-core architecture.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

Image sensors 1219 may include any suitable image sensors that may provide image data based on a scene. For example, image sensors 1219 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1219 may include any device that may detect information of a scene to generate image data.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of navigation controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, navigation controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
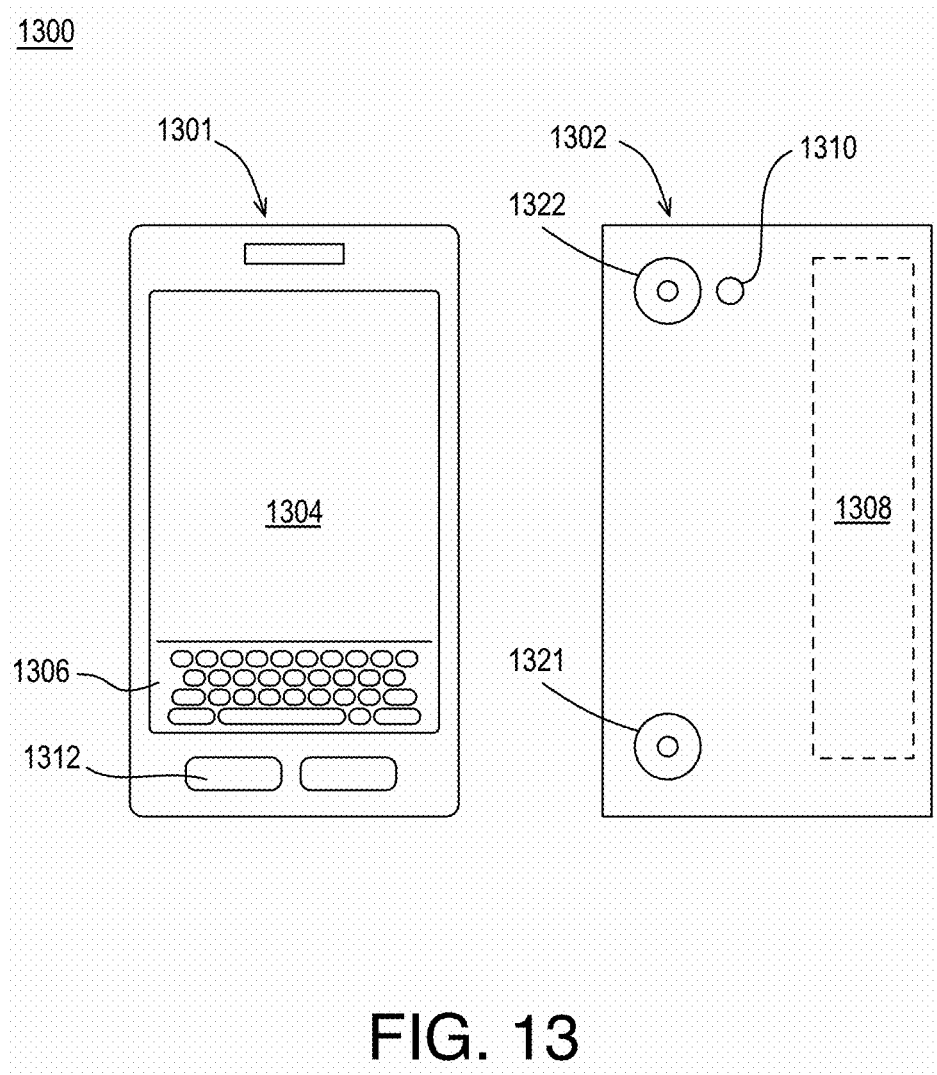
FIG. 13 illustrates an example device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, other systems, components, or modules discussed herein or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. pointand-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, a color camera 1321, a color camera 1322, and an integrated antenna 1308. In some embodiments, color camera 1321 and color camera 1322 attain planar images as discussed herein. In some embodiments, device 1300 does not include color camera 1321 and 1322 and device 1300 attains input image data (e.g., any input image data discussed herein) from another device. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include color cameras 1321, 1322, and a flash 1310 integrated into back 1302 (or elsewhere) of device 1300. In other examples, color cameras 1321, 1322, and flash 1310 may be integrated into front 1301 of device 1300 or both front and back sets of cameras may be provided. Color cameras 1321, 1322 and a flash 1310 may be components of a camera module to originate color image data with IR texture correction that may be processed into an image or streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a method for estimating optical flow for equirectangular image pairs comprises estimating optical flow between an input pair of equirectangular images to generate a first optical flow map, projecting polar regions in the input pair of equirectangular images to central regions in a second pair of equirectangular images, estimating optical flow between the second pair of equirectangular images to generate a second optical flow map, and combining regions of the first and second optical flow maps to generate a resultant optical flow map for the input pair of equirectangular images.

In one or more second embodiments, further to the first embodiment, projecting the polar regions in the input pair of equirectangular images to the central regions of the second pair of equirectangular images comprises projecting points from each of the input pair of equirectangular images to points in a world coordinate system, applying rotation parameters in the world coordinate system, and reprojecting the rotated points to points of the second pair of equirectangular images.

In one or more third embodiments, further to the first or second embodiments, applying the rotation parameters in the world coordinate system comprises translation of a position on a top or bottom image boundary corresponding to an edge of the polar regions in the input pair of equirectangular images to a horizontal centerline of the second pair of equirectangular images.

In one or more fourth embodiments, further to any of the first through third embodiments, applying the rotation parameters in the world coordinate system comprises applying a 90° rotation in the world coordinate system relative to an axis in the world coordinate system.

In one or more fifth embodiments, further to any of the first through fourth embodiments, projecting the polar regions in the input pair of equirectangular images to the central regions of the second pair of equirectangular images comprises a rotation in a world coordinate system corresponding to the input pair of equirectangular images and the second pair of equirectangular images and combining the regions of the first and second optical flow maps comprises applying an inverse rotation relative to the rotation to the second optical flow map.

In one or more sixth embodiments, further to any of the first through fifth embodiments, the resultant optical flow map comprises a central horizontal strip from the first optical flow map and top and bottom horizontal strips reprojected from the second optical flow map.

In one or more seventh embodiments, further to any of the first through sixth embodiments, a height of the top horizontal strip comprises not less than 15% of a total height of the resultant optical flow map.

In one or more eighth embodiments, further to any of the first through seventh embodiments, the method further comprises projecting second polar regions in the input pair of equirectangular images to central regions in a third pair of equirectangular images and estimating optical flow between the third pair of equirectangular images to generate a third optical flow map, wherein the resultant optical flow map for the input pair of equirectangular images comprises a combination of the first, second, and third optical flow maps.

In one or more ninth embodiments, further to any of the first through eighth embodiments, the method further comprises receiving an indicator of available computational resources for processing a received pair of equirectangular images and downsampling the second pair of equirectangular images prior to said estimation of optical flow between the second pair of equirectangular images in response to the indicator comparing unfavorably to a threshold.

In one or more tenth embodiments, further to any of the first through ninth embodiments, estimating the optical flow between the input pair of equirectangular images or estimating the optical flow between the second pair of equirectangular images comprises application of a convolutional neural network.

In one or more eleventh embodiments, a device or system includes a memory and one or more processors to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
   memory to store at least a portion of an input pair of equirectangular images;
   computer readable instructions; and
   at least one processor circuit to be programmed by the computer readable instructions to:
   estimate optical flow between the input pair of equirectangular images to generate a first optical flow map;
   project polar regions in the input pair of equirectangular images to central regions in a second pair of equirectangular images;
   estimate optical flow between the second pair of equirectangular images to generate a second optical flow map; and
   combine at least one region of the first optical flow map and at least one region of the second optical flow map to generate a resultant optical flow map for the input pair of equirectangular images.

2. The system of claim 1, wherein to project the polar regions in the input pair of equirectangular images to the central regions of the second pair of equirectangular images, one or more of the at least one processor circuit is to:
   project points of the input pair of equirectangular images to points in a world coordinate system;
   apply rotation parameters to the points in the world coordinate system to determine rotated points; and
   reproject the rotated points to points of the second pair of equirectangular images.

3. The system of claim 2, wherein to apply the rotation parameters in the world coordinate system, one or more of the at least one processor circuit is to translate a position on a top or bottom image boundary corresponding to an edge of the polar regions in the input pair of equirectangular images to a horizontal centerline of the second pair of equirectangular images.

4. The system of claim 3, wherein to apply the rotation parameters in the world coordinate system, one or more of the at least one processor circuit is to apply a 90° rotation in the world coordinate system relative to an axis in the world coordinate system.

5. The system of claim 1, wherein one or more of the at least one processor circuit is to:
   project the polar regions in the input pair of equirectangular images to the central regions of the second pair of equirectangular images based on a rotation in a world coordinate system corresponding to the input pair of equirectangular images and the second pair of equirectangular images; and
   combine the at least one region of the first optical flow map and the at least one region of the second optical flow map based on application of an inverse rotation relative to the second optical flow map.

6. The system of claim 5, wherein the resultant optical flow map includes a central horizontal strip from the first optical flow map and top and bottom horizontal strips reprojected from the second optical flow map.

7. The system of claim 6, wherein a height of the top horizontal strip is not less than 15% of a total height of the resultant optical flow map.

8. The system of claim 1, wherein the polar regions are first polar regions, the central regions are first central regions, and one or more of the at least one processor circuit is to:
   project second polar regions in the input pair of equirectangular images to second central regions in a third pair of equirectangular images; and
   estimate optical flow between the third pair of equirectangular images to generate a third optical flow map, the resultant optical flow map for the input pair of equirectangular images including a combination of the first optical flow map, the second optical flow map, and the third optical flow map.

9. The system of claim 1, wherein one or more of the at least one processor circuit is to:

obtain an indicator of available computational resources for processing the input pair of equirectangular images; and downsample the second pair of equirectangular images prior to estimation of the optical flow between the second pair of equirectangular images in response to the indicator comparing unfavorably to a threshold.

10. The system of claim 1, wherein one or more of the at least one processor circuit is to estimate at least one of the optical flow between the input pair of equirectangular images or the optical flow between the second pair of equirectangular images based on a convolutional neural network.

11. A method comprising:

estimating optical flow between an input pair of equirectangular images to generate a first optical flow map;

projecting, by at least one processor circuit programmed by at least one instruction, polar regions in the input pair of equirectangular images to central regions in a second pair of equirectangular images;

estimating optical flow between the second pair of equirectangular images to generate a second optical flow map; and combining, by one or more of the at least one processor circuit, at least one region of the first optical flow map and at least one region of the second optical flow map to generate a resultant optical flow map for the input pair of equirectangular images.

12. The method of claim 11, wherein the projecting of the polar regions in the input pair of equirectangular images to the central regions of the second pair of equirectangular images includes:

projecting points of the input pair of equirectangular images to points in a world coordinate system;

applying rotation parameters to the points in the world coordinate system to determine rotated points; and reprojecting the rotated points to points of the second pair of equirectangular images.

13. The method of claim 12, wherein the applying of the rotation parameters in the world coordinate system includes translating a position on a top or bottom image boundary corresponding to an edge of the polar regions in the input pair of equirectangular images to a horizontal centerline of the second pair of equirectangular images.

14. The method of claim 11, wherein the projecting of the polar regions in the input pair of equirectangular images to the central regions of the second pair of equirectangular images is based on a rotation in a world coordinate system corresponding to the input pair of equirectangular images and the second pair of equirectangular images, and the combining of the at least one region of the first optical flow map and the at least one region of the second optical flow map includes applying an inverse rotation to the second optical flow map.

15. The method of claim 11, wherein the polar regions are first polar regions, the central regions are first central regions, and further including:

projecting second polar regions in the input pair of equirectangular images to second central regions in a third pair of equirectangular images; and estimating optical flow between the third pair of equirectangular images to generate a third optical flow map, the resultant optical flow map for the input pair of equirectangular images including a combination of the first optical flow map, the second optical flow map, and the third optical flow map.

16. At least one memory comprising instructions to cause at least one processor circuit to at least:

estimate optical flow between an input pair of equirectangular images to generate a first optical flow map;

project polar regions in the input pair of equirectangular images to central regions in a second pair of equirectangular images;

estimate optical flow between the second pair of equirectangular images to generate a second optical flow map; and combine at least one region of the first optical flow map and at least one region of the second optical flow map to generate a resultant optical flow map for the input pair of equirectangular images.

17. The at least one memory of claim 16, wherein to project the polar regions in the input pair of equirectangular images to the central regions of the second pair of equirectangular images, the instructions are to cause one or more of the at least one processor circuit to:

project points of the input pair of equirectangular images to points in a world coordinate system;

apply rotation parameters to the points in the world coordinate system to determine rotated points; and reproject the rotated points to points of the second pair of equirectangular images.

18. The at least one memory of claim 17, wherein to apply the rotation parameters in the world coordinate system, the instructions are to cause one or more of the at least one processor circuit to translate a position on a top or bottom image boundary corresponding to an edge of the polar regions in the input pair of equirectangular images to a horizontal centerline of the second pair of equirectangular images.

19. The at least one memory of claim 16, wherein the instructions are to cause one or more of the at least one processor circuit to:

project the polar regions in the input pair of equirectangular images to the central regions of the second pair of equirectangular images based on a rotation in a world coordinate system corresponding to the input pair of equirectangular images and the second pair of equirectangular images; and combine the at least one region of the first optical flow map and the at least one region of the second optical flow map based on application of an inverse rotation to the second optical flow map.

20. The at least one memory of claim 16, wherein the polar regions are first polar regions, the central regions are first central regions, and the instructions are to cause one or more of the at least one processor circuit to:

project second polar regions in the input pair of equirectangular images to second central regions in a third pair of equirectangular images; and estimate optical flow between the third pair of equirectangular images to generate a third optical flow map, the resultant optical flow map for the input pair of equirectangular images including a combination of the first optical flow map, the second optical flow map, and the third optical flow map.

* * * * *